Patented Feb. 13, 1934

1,946,632

UNITED STATES PATENT OFFICE 1,946,632

MANUFACTURE OF MIXED ESTERS OF CELLULOSE

Carl J. Malm, Rochester, N. Y., assignor to Eastman Kodak Company, Rochester, N. Y., a corporation of New York No Drawing. Application January 11, 1929
Serial No. 331,958

22 Claims. (Cl. 260—101)

This invention relates to mixed organic esters of cellulose and particularly to a method of preparing such esters.

Hans T. Clarke and Carl J. Malm have described a new series of mixed organic esters of cellulose in an application, Serial No. 179,175, filed March 28, 1927, Patent No. 1,704,282, granted March 5, 1929 and certain methods of preparing such esters are described in U. S. Patents Nos. 1,800,860 and 1,880,808 of Clarke and Malm. In these esters, for every 24 carbon atoms in the cellulose there are less than 4 (but at least $\frac{1}{3}$ of 1) acyl groups selected from the higher fatty acids having more than 8 carbon atoms; and there are also enough acyl groups selected from the lower fatty acids having more than 1 and less than 6 carbon atoms to make said esters soluble in acetone and insoluble in benzol. They may conveniently be indicated by the following general formula:

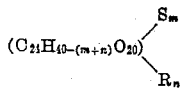

S represents acyl groups corresponding to fatty acids having more than 8 carbon atoms, such as pelargonic, capric, lauric, myristic, palmitic and stearic. R represents acyl groups corresponding to fatty acids having more than 1 and less than 5 carbon atoms, such as acetic, propionic, and butyric. In the above formula $m$ is always less than 4 but at least $\frac{1}{3}$ of 1, while $n$ is usually more than 8 and less than $11\frac{2}{3}$. The S groups may either all be alike or they may consist of a composite of several groups, each corresponding to a different higher fatty acid. For example, the S groups may all be stearyl groups, or some of them may be stearyl groups and some palmityl. Similarly, the R groups may all be alike or the different R groups may correspond to different lower fatty acids. Because of their commercial availability, we prefer to have the S groups selected from the stearyl or palmityl and to use acetyl groups alone for the R groups. For example, cellulose aceto-stearate and aceto-palmitate, or aceto-palmito-stearate having approximately 3 stearyl or palmityl or stearyl plus palmityl groups and 9 acetyl groups for every 24 carbon atoms in the cellulose group, are the best examples of the esters and exhibit fully their unique properties, including a remarkable flexibility when made into films. It will be seen thus that the sum of $m$ and $n$ are preferably approximately equal to 12.

When the relative proportions of the groups are altered beyond the limits given above, the properties of these esters change startlingly. For example if $m$ be increased to 4 or more in the formula given above, the resulting mixed ester becomes soluble in benzol instead of insoluble. Along with this change in solubility, the strength, hardness and other properties of films made from the esters, become relatively much poorer, the benzol-soluble esters, with the higher fatty acid groups being relatively soft and weak.

When, on the other hand, the proportion of higher fatty acyl groups, instead of being increased above 4, drops below $\frac{1}{3}$ of 1 group for every 24 carbon atoms in the cellulose, the valuable properties of acetone solubility and flexibility, even in dry atmospheres, are likewise lost. Where there is less than $\frac{1}{3}$ of a stearyl group, for example, and there are more than $11\frac{2}{3}$ acetyl groups for each 24 carbon atoms in the cellulose, the product is chloroform-soluble, acetone-insoluble, and closely resembles the well known unhydrolyzed fully esterified cellulose acetate.

Two general methods of preparing the mixed esters are described in the applications above identified. The first method includes the introduction of groups corresponding to the acetyl and stearyl groups simultaneously. This method has the disadvantage that the reaction mixture contains both stearic and acetic acid and when the product is precipitated the washing of the precipitate and the recovery and separation of the reagents is rather difficult. In the second method, groups corresponding to the acetyl group are first introduced by ordinary acetylation, followed by partial hydrolysis. At the end of this step the product is precipitated, washed out and dried, after which groups corresponding to the stearyl group are added. The product is under the process twice taken into solution and twice precipitated, a rather inconvenient procedure in which losses of chemicals are difficult to avoid.

It is the object of the present invention to provide an improved method of preparing mixed organic esters of cellulose and to avoid the difficulties which are met in the practice of the previously known procedure.

I have discovered that mixed organic esters of cellulose corresponding to those described in the applications of Clarke and Malm, hereinbefore identified, can be prepared advantageously by first introducing groups corresponding to the stearyl group and then introducing groups corresponding to the acetyl group. The procedure is thus divided into two steps, the groups corresponding to the stearyl group being first added to the cellulose. The procedure has distinct advantages. The product of the first step in the method consists of cellulose to which the group corresponding to the stearyl group has been added. This product is not soluble in the solution and consequently it can be freed easily from the reaction mixture. Filtering and washing are thus facilitated. The stearic or corresponding acid is easily removed. At the conclusion of the second step, no acid corresponding to stearic acid is present and the product is easily isolated. Filtration and washing of this product present no difficulties and the product is easily recovered, therefore, in condition for further treatment and utilization.

In preparing the esters, I can utilize cellulose materials from any of the sources customarily used in the manufacture of high grade esters, such as cotton fiber, tissue paper, clean cotton fiber, surgical cotton wool, and even sulfite wood pulp, preferably bleached. These materials, especially the cotton materials, are undegraded and yield esters which are likewise substantially unimpaired or undegraded, as evidenced by the flexibility of films prepared from them. Though I prefer to use materials having the minimum preliminary degradation, I, nevertheless, can make organic esters of the type described from cellulose materials which have been chemically pretreated to form so called hydrocellulose and reverted cellulose, such as from the viscose and cuprammonium processes.

The invention will be better understood by reference to the following examples which represent the preferred procedure. These examples relate particularly to the preparation of aceto stearates, since these esters are among the cheapest and most useful of those which can be prepared in accordance with the invention. The principles of procedure apply, however, to the preparation of other mixed esters as described in the application of Clarke and Malm, Serial No. 179,175.

*Example I*

(a) 10 grams of tissue paper are added to a mixture of 25 grams of stearyl chloride and 75 grams of pyridine and the mixture is maintained at 80 to 90° C. for 18 hours. It is then filtered, washed well with methyl alcohol and the solid product is dried. This product contains about 35% stearyl.

(b) 5 grams of the product (a) are added to a mixture of 20 grams of acetic anhydride, 0.1 gram of copper perchlorate and 50 cc. of tetrachlorethane. This mixture is maintained at 60 to 65° C. for about 2 hours or until a clear dope free from grain and fiber is obtained. The dope is precipitated with methyl alcohol to give a product containing 20% stearyl soluble in tetrachlorethane and chloroform but insoluble in acetone, benzene, acetic acid and chloracetic acid.

*Example II*

(c) 10 grams of tissue paper are added to the mixture of 40 grams of stearyl chloride and 100 grams of pyridine and the mixture is maintained at 80 to 90° C. for 20 hours. It is then filtered and the solid product is washed with methyl alcohol and dried. It contains 57% stearyl.

(d) 5 grams of the product (c) are added to a mixture of 20 grams of acetc anhydride, 0.1 grams of copper perchlorate, and 50 cc. of tetrachlorethane. The mixture is maintained at 50 to 55° C. for about 3 hours or until a clear dope is obtained. The dope is precipitated with methyl alcohol. The product is soluble in tetrachlorethane and chloroform and insoluble in acetone, benzene, acetic acid, and chloracetic acid.

*Example III*

(e) 10 grams of tissue paper, are added to a mixture of 40 grams stearyl chloride and 100 grams of pyridine, and the mixture is maintained at 80 to 90° C. for 20 hours. It is then filtered and the product is washed with methyl alcohol and dried. It contains 57% stearyl.

(f) The product (e) is added to a mixture of 20 grams of acetc anhydride, 0.1 grams of copper perchlorate and 50 cc. of chloroform. This mixture is maintained at 50 to 60° C. for about 3 hours or until a clear dope is obtained. The dope is precipitated with methyl alcohol. The product contains 46% stearyl, is soluble in tetrachlorethane and chloroform but insoluble in acetone, benzene, acetic acid and chloracetic acid.

*Example IV*

(g) Soda cellulose prepared from 10 grams of cellulose wth 40% sodium hydroxid is added to a mixture of 50 grams of stearyl chloride and 20 cc. of benzene. The mixture is kept at room temperature (20 to 30° C.) for 24 hours. It is then filtered, washed with water and methyl alcohol and dried. The product contains 45% stearyl.

(h) 5 grams of the products (g) are added to a mixture of 20 grams of acetic anhydride, 0.1 grams of copper perchlorate, and 50 cc. of tetrachlorethane, and the mixture is maintained at 50 to 55° C. for about 3 hours or until a clear dope is obtained. The dope is precipitated with methyl alcohol and the product contains 35% stearyl. It is soluble in tetrachlorethane and chloroform but insoluble in acetone, benzene, acetic acid and chloracetic acid.

The introduction of the higher fatty acids may be accomplished in the method as described by employing any of the known procedures for the addition of such groups to cellulose. I prefer to employ a mixture of pyridine and, for example, stearyl chloride, or to treat soda cellulose with stearyl chloride in the presence of a diluent, such as benzene, as indicated in the foregoing examples. Other methods are, however, available. Acylation is accomplished with difficulty with ordinary acylation mixtures. I have found, however, that the difficulty is avoided by using tetrachlorethane or chloroform as a solvent and that, under such conditions, acylation proceeds smoothly.

The products prepared by the described method differ from the mixed esters prepared by the methods of Clarke and Malm in that they are generally insoluble in acetone, benzene, acetic acid and chloracetic acid. They are soluble in tetrachlorethane and chloroform. They are adapted for various purposes and are particularly useful for the production of a very flexible film which can be prepared by dissolving the esters in tetrachlorethane or chloroform and coating the film on a supporting surface in accordance with the usual practice. Such films are transparent, waterproof, strong, and of low inflammability. They may be prepared with or without plasticizers or substances of low volatility, commonly called softeners. The mixed esters may also be used in making multiple plastic compositions, in varnishes and lacquers, in artificial leather, as a coating for fabrics, in rayon, and in fact many ways in which organic cellulose esters have been employed heretofore, but by reason of their special properties hereinabove enumerated, they are particularly advantageous.

Having thus described my invention, what I claim as new and desire to secure by Letters Patent is:

1. The process of making organic esters of cellulose which comprises treating cellulose with an acyl halide selected from the group which consists of the halides of the aralkyl monocarboxylic acids, the aromatic monocarboxylic acids, and the aliphatic monocarboxylic acids including the cycloparaffinic, and subsequently acylating that product with an agent containing less carbon atoms than the acyl halide.

2. The process of making organic esters of cellulose which comprises treating cellulose with an acyl halide selected from the group which consists of the halides of the aralkyl monocarboxylic acids, the aromatic monocarboxylic acids, and the aliphatic monocarboxylic acids including the cycloparaffinic, and subsequently acylating that product in the presence of a chlorine derivative of the methane series with an agent containing less carbon atoms than the acyl halide.

3. The process of making organic esters of a cellulose which comprises treating cellulose with an acyl halide selected from the group which consists of the halides of the aralkyl monocarboxylic acids, the aromatic monocarboxylic acids, and the aliphatic monocarboxylic acids including the cycloparaffinic, in the presence of pyridine and subsequently acylating that product with an agent containing less carbon atoms than the acyl halide.

4. The process of making organic esters of cellulose which comprises treating cellulose with an acyl halide selected from the group which consists of the halides of the aralkyl monocarboxylic acids, the aromatic monocarboxylic acids, and the aliphatic monocarboxylic acids including the cycloparaffinic, and subsequently acylating that product in the presence of tetrachlorethane with an agent containing less carbon atoms than the acyl halide.

5. The process of making organic esters of cellulose which comprises treating cellulose with an acyl halide selected from the group which consists of the halides of the aralkyl monocarboxylic acids, the aromatic monocarboxylic acids, and the aliphatic monocarboxylic acids including the cycloparaffinic, and subsequently acylating that product in the presence of chloroform with an agent containing less carbon atoms than the acyl halide.

6. The process of making organic esters of cellulose which comprises treating soda cellulose with an acyl halide selected from the group which consists of the halide of the aralkyl monocarboxylic acids, the aromatic monocarboxylic acids, and the aliphatic monocarboxylic acids including the cycloparaffinic, and subsequently acylating that product with an agent containing less carbon atoms than the acyl halide.

7. The process of making organic esters of cellulose which comprises treating soda cellulose with an acyl halide selected from the group which consists of the halides of the aralkyl monocarboxylic acids, the aromatic monocarboxylic acids, and the aliphatic monocarboxylic acids including the cycloparaffinic, in the presence of benzene, and subsequently acylating that product with an agent containing less carbon atoms than the acyl halide.

8. The process of making organic esters of cellulose which comprises treating cellulose with a halide of a higher aliphatic monocarboxylic acid having more than 8 carbon atoms and subsequently acylating that product with an agent containing less carbon atoms than the halide.

9. The process of making organic esters of cellulose which comprises treating cellulose with a halide of a higher aliphatic monocarboxylic acid having more than 8 carbon atoms and subsequently acylating that product with an agent containing more than 1 and less than 5 carbon atoms.

10. The process of making organic esters of cellulose which comprises treating cellulose with a halide of a higher fatty acid having more than 8 carbon atoms and subsequently acylating that product with an agent containing less carbon atoms than the halide.

11. The process of making organic esters of cellulose which comprises treating cellulose with a halide of a higher fatty acid having more than 8 carbon atoms and subsequently acylating that product with anhydride of a lower fatty acid having more than 1 and less than 5 carbon atoms.

12. The process of making organic esters of cellulose which comprises treating cellulose with the halide of an acid selected from the group consisting of lauric, myristic, palmitic and stearic acids and subsequently acylating that product with an acylating agent selected from the group consisting of acetic, propionic and butyric anhydrides.

13. The process of making organic esters of cellulose which comprises treating cellulose with stearyl chloride and subsequently acylating that product with acetic anhydride.

14. The process of making organic esters of cellulose which comprises treating cellulose with an acyl halide selected from the group which consists of the halides of the aralkyl monocarboxylic acids, the aromatic monocarboxylic acids and the aliphatic monocarboxylic acids including the cycloparaffinic, in the presence of a diluent, and subsequently treating the product with an acylating agent in the presence of a chlorine derivative of the methane series, the agent containing less carbon atoms than the acyl halide.

15. A mixed organic ester of cellulose insoluble in acetone and soluble in tetrachlorethane prepared by reacting upon cellulose with an acyl halide selected from the group which consists of the halides of the aralkyl monocarboxylic acids, the aromatic monocarboxylic acids, and the aliphatic monocarboxylic acids including the cycloparaffinic, and then acylating the product thereof with an acylating agent containing less carbon atoms than the acyl halide.

16. A mixed organic ester of cellulose insoluble in acetone and soluble in tetrachlorethane prepared by reacting upon cellulose with the halide of a fatty acid of more than 8 carbon atoms and then acylating the product thereof with an acylating agent which will add acyl groups of more than 1 and less than 5 carbon atoms thereto.

17. A mixed organic ester of cellulose insoluble in acetone and soluble in tetrachlorethane prepared by reacting upon cellulose with the halide of a fatty acid of more than 8 carbon atoms and then acetylating the product thereof.

18. A mixed organic ester of cellulose insoluble in acetone and soluble in tetrachlorethane prepared by reacting upon cellulose with an acyl halide selected from the halides of lauric, myristic, palmitic, and stearic acids and then acylating the product thereof with an acylating agent which will add acyl groups of more than 3 and less than 5 carbon atoms thereto.

19. A mixed organic ester of cellulose insoluble in acetone and soluble in chloroform prepared by reacting upon cellulose with an acyl halide selected from the group which consists of the halides of lauric, myristic, palmitic, and stearic acids and then acetylating the product thereof.

20. A mixed organic ester of cellulose insoluble in acetone and soluble in tetrachlorethane prepared by reacting upon cellulose with the halides of stearic and palmitic acids and then acetylating the product thereof.

21. A mixed organic ester of cellulose insoluble in acetone and soluble in tetrachlorethane prepared by reacting upon cellulose with the halides of stearic and palmitic acids and then acylating the product thereof with an acylating agent which will add acyl groups of more than 1 and less than 5 carbon atoms thereto.

22. A cellulose acetate stearate insoluble in acetone and soluble in tetrachlorethane prepared by reacting upon cellulose with stearyl halide and then acetylating that product with an esterification bath comprising acetic anhydride.

CARL J. MALM.